United States Patent
Abramson et al.

[11] Patent Number: 5,606,670
[45] Date of Patent: Feb. 25, 1997

[54] METHOD AND APPARATUS FOR SIGNALLING A STORE BUFFER TO OUTPUT BUFFERED STORE DATA FOR A LOAD OPERATION ON AN OUT-OF-ORDER EXECUTION COMPUTER SYSTEM

[75] Inventors: Jeffrey M. Abramson, Aloha; Haitham Akkary, Portland; Andrew F. Glew, Hillsboro; Glenn J. Hinton; Kris G. Konigsfeld, both of Portland; Paul D. Madland; David B. Papworth, both of Beaverton, all of Oreg.

[73] Assignee: Intel Corporation, Santa Clara, Calif.

[21] Appl. No.: 636,173

[22] Filed: Apr. 22, 1996

Related U.S. Application Data

[63] Continuation of Ser. No. 176,111, Dec. 30, 1993, abandoned.

[51] Int. Cl.$^6$ ........................................ G06F 9/22
[52] U.S. Cl. ........................ 395/250; 364/239; 364/939
[58] Field of Search ................................. 395/375, 800, 395/250

[56] References Cited

U.S. PATENT DOCUMENTS

| | | | |
|---|---|---|---|
| 4,942,525 | 7/1990 | Shintani | 395/375 |
| 4,991,090 | 2/1991 | Emma et al. | 395/575 |
| 5,303,356 | 4/1994 | Vassiliadis | 395/375 |

OTHER PUBLICATIONS

James Smith, "Dynamic Instruction Scheduling and the Astronautics ZS–1", IEEE 1989, pp. 1–34.

Kenji Minagawa, "Pre–Decoding Mechanism For Super scalar Architecture", IEEE Pacific Rim Conference, May 9, 1991.

"The Metaflow Architecture", ©1991 IEEE, Jun. IEEE Micro, Authors: Val Popescu, Merle Schultz, John Spracklen, Gary Gibson, Bruce Lightner, David Isaman.

*Primary Examiner*—David Y. Eng
*Attorney, Agent, or Firm*—Blakely, Sokoloff, Taylor & Zafman

[57] ABSTRACT

Store forwarding circuitry is provided to an out-of-order execution processor having a store buffer of buffered memory store operations. The store forwarding circuitry conditionally forwards store data for a memory load operation from a variable subset of the buffered memory store operations that is functionally dependent on the time the memory load operation is issued, taking into account the execution states of these buffered memory store operations. The memory load operation may be issued speculatively and/or executed out-of-order. The execution states of the buffered memory store operations may be speculatively executed or committed. The data and address aspects of the memory store operations may be executed separately.

32 Claims, 10 Drawing Sheets

METHOD AND APPARATUS FOR SIGNALLING A STORE BUFFER TO OUTPUT BUFFERED STORE DATA FOR A LOAD OPERATION ON AN OUT-OF-ORDER EXECUTION COMPUTER SYSTEM

This is a continuation of application Ser. No. 08/176,111, filed Dec. 30, 1993 now abandoned.

BACKGROUND OF THE INVENTION

1. Field of the Invention

The present invention relates to the field of computer systems. More specifically, the present invention relates to forwarding buffered store data on an out-of-order execution computer system.

2. Background

Store buffers have been employed in the art on in-order execution computer systems for buffering memory store operations, thereby freeing the central processing unit (CPU) to continue to execute other instructions without having to wait for the actual completion of memory store operations. In order to avoid incorrect data being returned for memory load operations, typically the entire store buffer is checked for address conflicts for each memory load operation. If at least one address conflict is detected, the memory load operation is blocked and the entire store buffer is flushed, causing all the buffered memory store operations to be performed immediately. In the meantime, the memory load operation remains blocked and the CPU waits while the flush operation is being performed. The memory load operation is unblocked at the end of the flush operation, and the CPU resumes execution upon return of the data being loaded.

Typically, the address conflict checks are performed using physical addresses, because memory locations are referenced with physical addresses and accordingly the memory store operations are buffered with physical addresses. In other words, in a virtually addressed in-order execution computer system, the address conflict checks are generally performed after the virtual address of a memory load operation has been translated into physical address. Alternatively, the address conflict checks can be performed using the identical portions of the virtual and physical addresses, thereby allowing the checks to be performed earlier before the translation of the virtual address of a memory load operation is completed. While some of the flushes will be unnecessary, since multiple virtual addresses can map to the same physical address, nevertheless there could be a net performance gain from being able to start the flush operations earlier.

Additionally, in some prior-art in-order execution computer systems, the data of the youngest address conflicting buffered memory store operation is also by-passed to the CPU, thereby allowing earlier unblocking of the memory load operation and resumption of execution by the CPU. Since the memory store operations are executed in order, the youngest address conflicting buffered memory store operation always precedes the memory load operation. Thus, its data is the appropriate buffered store data to be forwarded.

However, on an out-of-order execution computer system, because not all buffered memory store operations are necessarily in processor or retirement ready states, a flush operation cannot be initiated whenever address conflicts are detected for a memory load operation. In fact, on an out-of-order execution computer system where the address and data aspects of a memory store operation are performed separately, some buffered memory store operations may not even be in speculatively executed states, which precede the processor or retirement ready states. For these buffered memory store operations, there are no store data available for forwarding. Furthermore, on an out-of-order execution computer system, the youngest of all address conflicting buffered memory store operations does not necessarily always precede the memory load operation. Thus, its store data is not necessarily the appropriate buffered store data to be forwarded.

For the purpose of this application, retirement ready state is synonymous with process ready state, and it means the associated data are ready to be committed and made visible to system elements external to the out-of-order execution unit.

Therefore, it is desirable to be able to appropriately forward buffered memory store data on an out-of-order execution computer system. In particular, on an out-of-order execution computer system where the address and data aspects of a memory store operation are performed separately. Since performance is typically paramount on these computer systems, this forwarding ability is especially desirable on an out-of-order execution computer system with limited number of general purpose registers, where there will be a lot of memory store operations intermixed with memory load operations involving the same registers. As will be disclosed, the present invention provides for a method and apparatus for forwarding buffered store data on an out-of-order execution computer system that advantageously achieves these and other desirable results.

SUMMARY OF THE INVENTION

Under the present invention, the desirable results are advantageously achieved by providing store forwarding circuitry that conditionally forwards store data for a memory load operation from a variable subset of the buffered memory store operations that is functionally dependent on the time the memory load operation is issued, taking into account the execution states of these buffered memory store operations. The memory load operation may be issued speculatively and/or executed out-of-order. The execution states of the buffered memory store operations may be speculatively executed or committed. The data and address aspects of the memory store operations may be executed separately.

In one embodiment, the store forwarding circuitry comprises address conflict detection circuitry, store eligibility detection circuitry, load eligibility detection circuitry, and prioritization and selection circuitry. The address conflict detection circuitry identifies all address conflicts between the memory load and buffered memory store operations, using the untranslated portions of the virtual addresses. The store eligibility detection circuitry determines whether the store data of the buffered memory store operations are eligible to be forwarded, taking into account their execution states. Additionally, the store eligibility detection circuitry takes into account a number of application dependent factors, such as address alignment, access length alignment, store data split, and store type. The load eligibility detection circuitry determines whether the memory load operation is eligible to be forwarded store data, taking into account a number of application dependent factors, such as memory type, load data split, and load type. The prioritization and selection circuitry prioritization, selects and forwards one of the store data within the variable subset if any, based on the conflict detection results, the store, and the load eligibility detection results.

DETAILED DESCRIPTION

In the following description for purposes of explanation, specific numbers, materials and configurations am set forth in order to provide a thorough understanding of the present invention. However, it will be apparent to one skilled in the art that the present invention may be practiced without the specific details. In other instances, well known systems are shown in diagrammatic or block diagram form in order not to obscure the present invention unnecessarily. For ease of explanation, unless otherwise stated, the terms load and store operations in the description to follow are intended to mean memory load and store operations.

Figure 1:
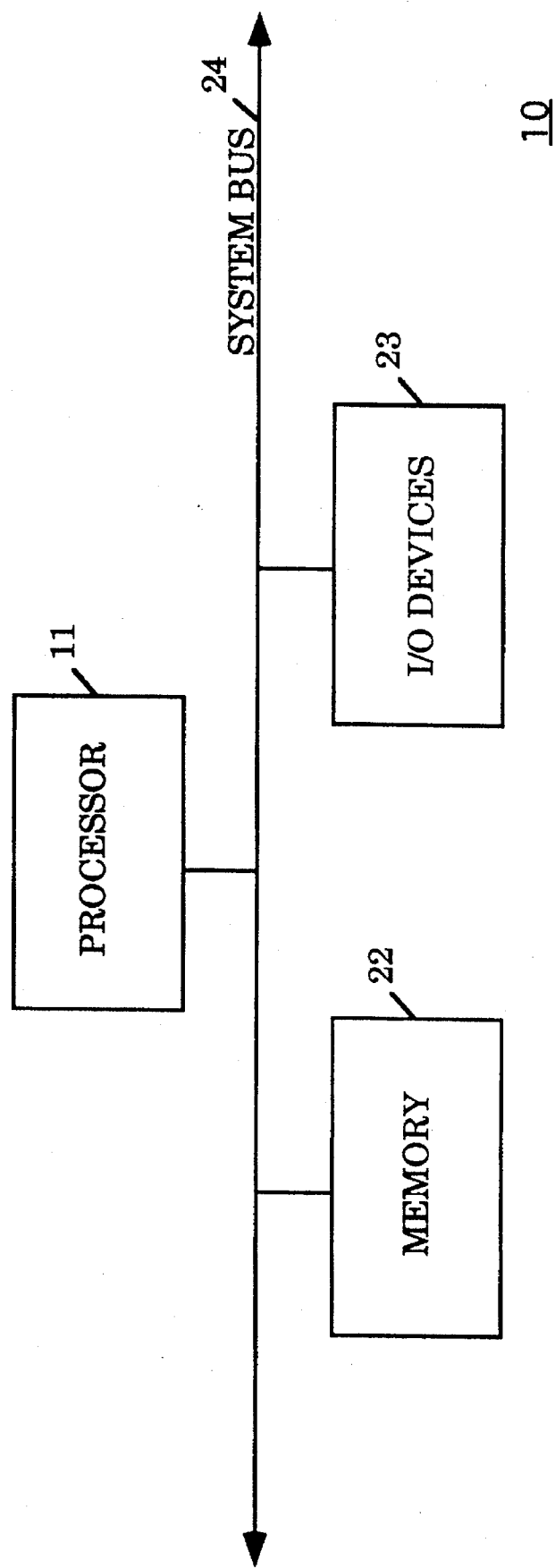
FIG. 1 illustrates an exemplary computer system incorporating the teachings of the present invention.

Referring now to FIG. 1, a block diagram illustrating an exemplary computer system incorporating the teachings of the present invention is shown. The exemplary computer system 10 comprises a processor 11, a memory unit 22, a number of I/O devices 23, and a system bus 24, coupled to each other as shown. The processor 11 is disposed on a single silicon based chip. The exemplary computer system 10 supports virtual address spaces comprising memory locations of the memory unit 22 and the addresses of the I/O devices 23, which are partitioned into memory pages and organized into memory segments. During program execution, the processor 11 buffers store operations and forwards buffered store data to load operations if appropriate. The processor 11 references memory space locations using linear addresses, which in turn get translated into physical addresses. The processor 11 computes a linear address using a base address, a displacement value, a scale value, an index value, and a segment value. A linear address is 32 bits long with the 20 higher order bits, which get translated, identifying a memory page, and the 12 lower order bits, which do not get translated, identifying the offset into the memory page (see ref. 92 of FIG. 12). A physical address is 40 bits long with the 28 higher order bits being the translated portion of the linear address locating the memory page, and the 12 lower order bits being the untranslated portion locating the offset into the memory page (see ref. 94 of FIG. 12).

Except for the teachings of the present invention incorporated in the processor 11, the elements 11, 23–24, are intended to represent a broad category of processors, memory units, I/O devices, and system buses found on many computer systems. Their basic functions and constitutions are well known, thus will not be otherwise further described. The teachings of the present invention incorporated in the processor 11 for forwarding appropriate ones of the buffered store data to load operations will be described in further detail below with additional references to the remaining figures.

While for ease of understanding, the present invention is being described with the exemplary computer system 10, based on the description to follow, it will be appreciated that the present invention may be practiced on other computer systems configured in other manners, and/or having different addressing mechanisms. The functions of the processor 11 may be disposed on one or more chips, fabricated using silicon or other equivalent semiconductor materials.

Figure 2:
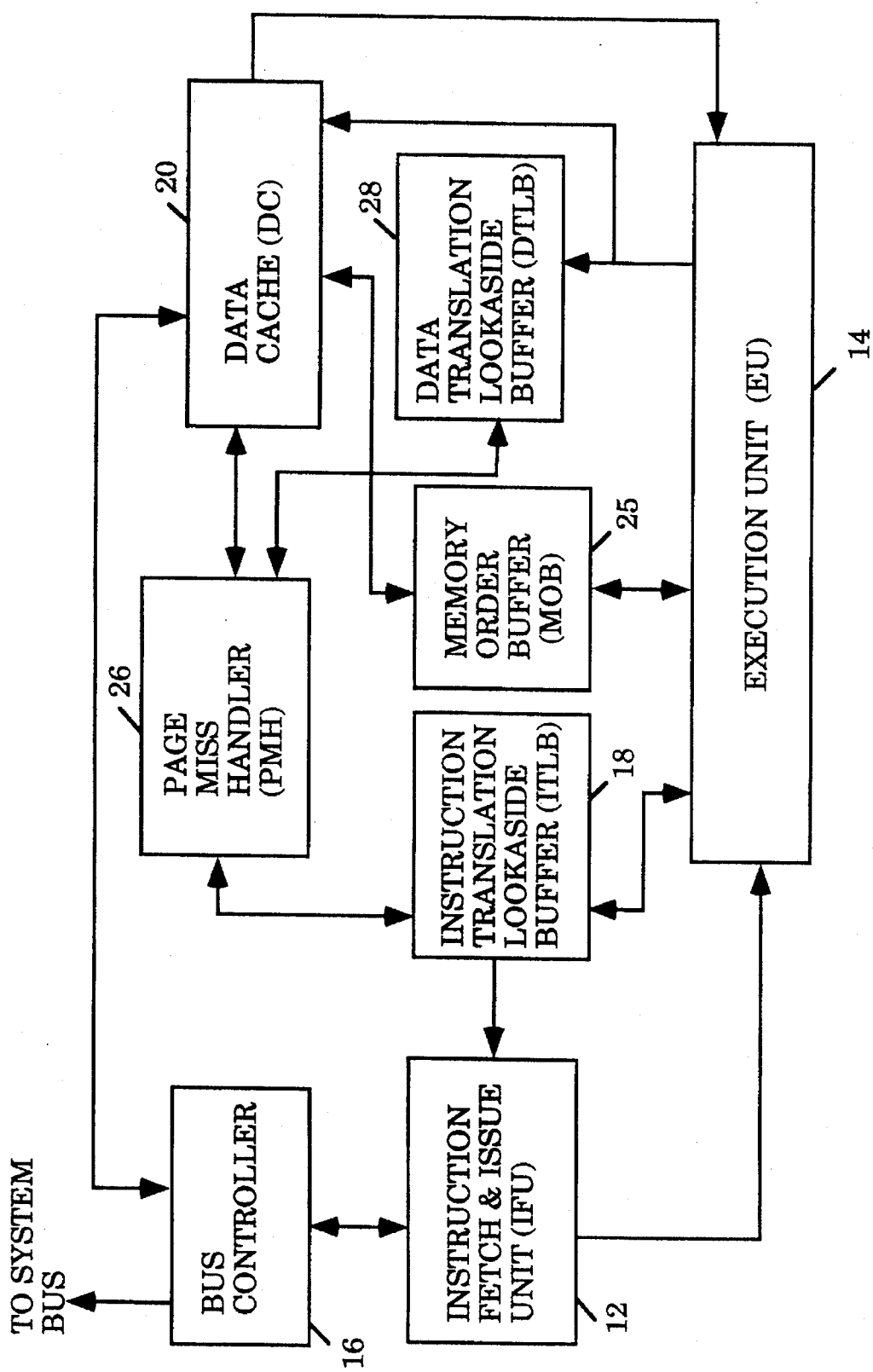
FIG. 2 illustrates the relevant portions of one embodiment of the processor unit of FIG. 1 in further detail.

Referring now to FIG. 2, a block diagram illustrating the processor 11 of FIG. 1 in further detail are shown. As illustrated, the processor 11 comprises an instruction fetch and issue unit (IFU) 12, an execution unit (EU) 14, a bus controller 16, an instruction and a data translation lookaside buffer (ITLB and DTLB) 18 and 28, a page miss handler (PMH) 26, a memory order buffer (MOB) and a data cache (DC) 20. The IFU 12 includes an instruction cache (not shown). The elements 12–28 are coupled to each other as illustrated. Together they cooperate to fetch, issue, execute, and save execution results of instructions in a pipelined manner.

The IFU 12 fetches instructions from the memory unit 22 through the bus controller 16 and the system bus 24, stores them in the instruction cache, and issues them in order to the execution unit 14 for execution. Some instructions are fetched and issued speculatively. The EU 14 executes the instructions as soon as their operand dependencies on execution results of preceding instructions are resolved, including those instructions that are speculatively fetched and issued. In other words, the instructions are not necessarily executed in the order they were issued, and some instructions are speculatively executed. However, the execution results are retired or committed in order, and speculative execution results of mispredicted branches are purged.

Data loads and stores are dispatched from the EU 14 to the MOB 25 and DC 20. Some data loads and stores are dispatched speculatively. Data loads are dispatched as a single operation, whereas data stores are dispatched as two operations, a store data operation (STD) and a store address operation (STA). As will be described in further detail below, data loads are buffered in a load buffer (LB) in the MOB 25, whereas the data stores are buffered in a store data buffer (SDB) of the EU 14, a store address buffer (SAB) of the MOB 25, and a physical address buffer (PAB) of the DC 20. The retirement circuitry of the EU 14 promotes the buffered data loads and stores to processor or retirement ready states in due course, and then retires or commits the data loads and stores in order. The data stores may be promoted to speculatively executed states before being promoted to processor or retirement ready states. The data cache 20 responds to the data loads, regardless of whether or not the data loads are speculative. Additionally, the MOB 25 forwards store data for the data loads if appropriate.

Both the instruction cache of the IFU 12 and the data cache 20 are physically addressed. The ITLB 18 and the DTLB 28, among other functions, are used to translate the accessing linear addresses that are currently cached into physical addresses through table lookups, and provide memory types for the physical addresses. The PMH 26 is used to handle page misses in both the instruction cache of the IFU 12, and the data cache 20, which includes among other functions, translation of page missed linear addresses into physical addresses, determination of memory types for the page missed physical addresses, and causing the allocation and filling of cache lines.

The IFU 12 is intended to represent a broad category of instruction fetching and issuing elements found in many computer systems. Its function and constitution are well known and will not be further described. The EU 14 is also intended to represent a broad category of execution units found in many computer systems, including but not limited to the execution unit described in the U.S. Pat. No. 5,463,745 entitled Method and Apparatus For Determining The Next Instruction Pointer In An Out-Of-Order Execution Computer System, filed on Dec. 22, 1993, assigned to the assignee of the present invention, which is also hereby fully incorporated by reference.

The ITLB 18, DTLB 28, and the PMH 26 are also intended to represent a broad category of these elements found in many computer systems, including but not limited to the ITLB, DTLB and PMH described in the copending U.S. patent application Ser. No. 08/171,528, entitled Method and Apparatus For Determining Memroy Type By A Processor, filed on Dec. 22, 1993, assigned to the assignee of the present invention, which is also hereby fully incorporated by reference.

The bus controller 16 and the data cache 20 are also intended to represent a broad category of these elements found in most computer systems. Their functions and constitutions are well known and will not be further described. The MOB 25, in particular, the teachings of the present invention for forwarding appropriate ones of the buffered store data to the data loads will be described in further detail below.

Figure 3:
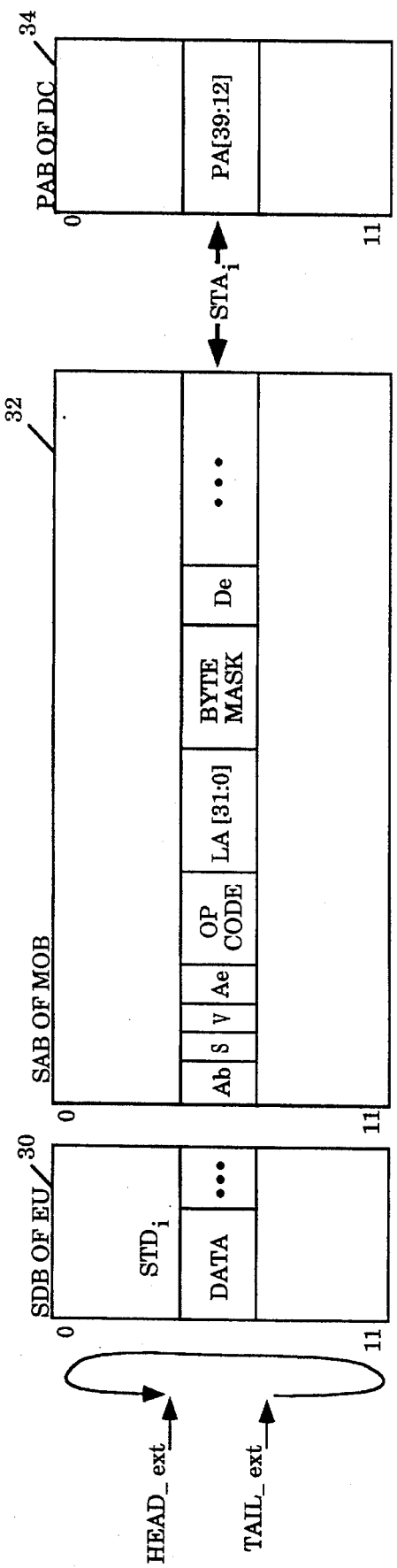
FIG. 3 illustrates the physical address buffer (PAB) of the data cache (DC), the store data buffer (SDB) of the execution unit (EU), and the store address buffer (SAB) of the memory order buffer (MOB) of FIG. 2.

Referring now to FIG. 3, a block diagram illustrating the SDB of the EU 14, the SAB of the MOB 25, and the PAB of the DC 20 is shown. The SDB 30, the SAB 32, and the PAB 34, all comprise equal number of buffer slots, 12 buffer slots for the illustrated embodiment. Each buffer slot is identified by a store buffer identifier (SBID). The buffer slots are allocated in order from top to bottom and then wraps around in a circular manner after reaching the bottom buffer slot. A wraparound bit is set/reset each time the allocation wraps around. A head pointer (SAB head_ext) comprising a SBID and a wraparound bit value, and a tail pointer (SAB tail_ext) comprising also a SBID and a wraparound bit value, are used to track the youngest and the oldest entries in these buffers. The head pointer is updated whenever a buffer slot is allocated for a store operation. Similarly, the tail pointer is updated whenever an allocated buffer slot is deallocated.

The STD and STA operations of each store operation are allocated a set of corresponding buffer slots of the SDB 30, the SAB 32, and the PAB 34, and identified by the SBID of the allocated set of corresponding buffer slots. The STD operation, including the store data, is stored in its allocated buffer slot in the SDB 30. The STA operation, including the opcode and the linear address (LA[31:0]), is stored in a corresponding buffer slot in the SAB 32. Additionally, a number of control and state bits, including an all blocking bit (Ab), a split bit (s), a valid bit (v), a STA execution state bit (Ae), a store byte mask, and a STD execution state bit (De) are stored in the buffer slot in the SAB 32. Lastly, the 28 high order bits of the physical address (PA[39:12]) of the STA operation are stored in a corresponding buffer slot in the PAB 34.

Figure 11:
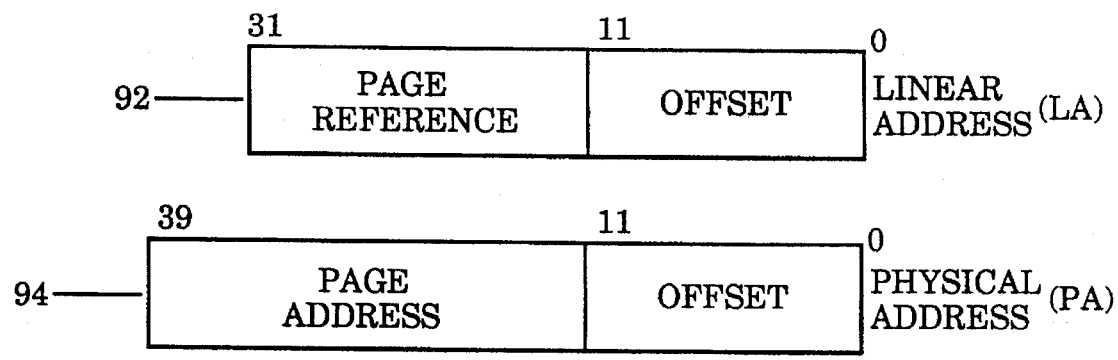
FIG. 11 illustrates one embodiment of linear and physical addresses used by the exemplary computer system of FIG. 1.

The Ab-bit indicates all load operations that have address conflicts with this STA operation are to be blocked and its store data are not to be forwarded. The s-bit indicates whether the buffered store operation references memory locations that span two 64-bit data blocks (see ref. 90a–90b of FIG. 11). The v-bit indicates whether the particular SAB entry is valid. The Ae-bit and the De-bit indicate whether the respective STA or STD operation has been promoted to at least a speculatively executed state, i.e. speculatively executed or retirement ready. The size of a store operation is inferred from the opcode. Lastly, the store byte mask provides for byte access checking of store operations to load operations.

The STD and STA operations of most store operations are promoted to the processor or retirement ready state in due course. The store data of retirement ready STD and STA operations are then written into the data cache 20 in the "background", when the data cache 20 is free, and then purged from the SDB 30, the SAB 32, and the PAB 34. The STD and STA operations of some of the store operations, such as those storing data to memory locations mapped to I/O devices, are not eligible to be promoted to the processor or retirement ready state. The STD and STA operations of these store operations are retired/committed, and purged from the SDB 30, the SAB 32, and the PAB 34 concurrently with their executions, e.g. when the target I/O devices are ready to accept the data being "stored". In this embodiment, the linear addresses are driven from the SAB 54 to the DTLB 28 again, and the newly generated PA is directly provided to the tag array of the data cache 20, bypassing the PAB 34 of the data cache 20. Additionally, if a store operation involves storing data to memory locations spanning two 64-bit data blocks, the MOB 25 signals the data cache 20, and the STD and STA operations are driven to the data cache 20 twice, with the data size and the physical address being adjusted accordingly the second time.

While the present invention is being described with a store operation being dispatched as a STD and a STA operation, and the store operands are buffered in separate buffers disposed in different components of the system, based on the descriptions to follow, it will be appreciated that the present invention may be practiced with the store operation being dispatched as one or more operations, and with the store operands being buffered in one or more buffers.

Figure 4:
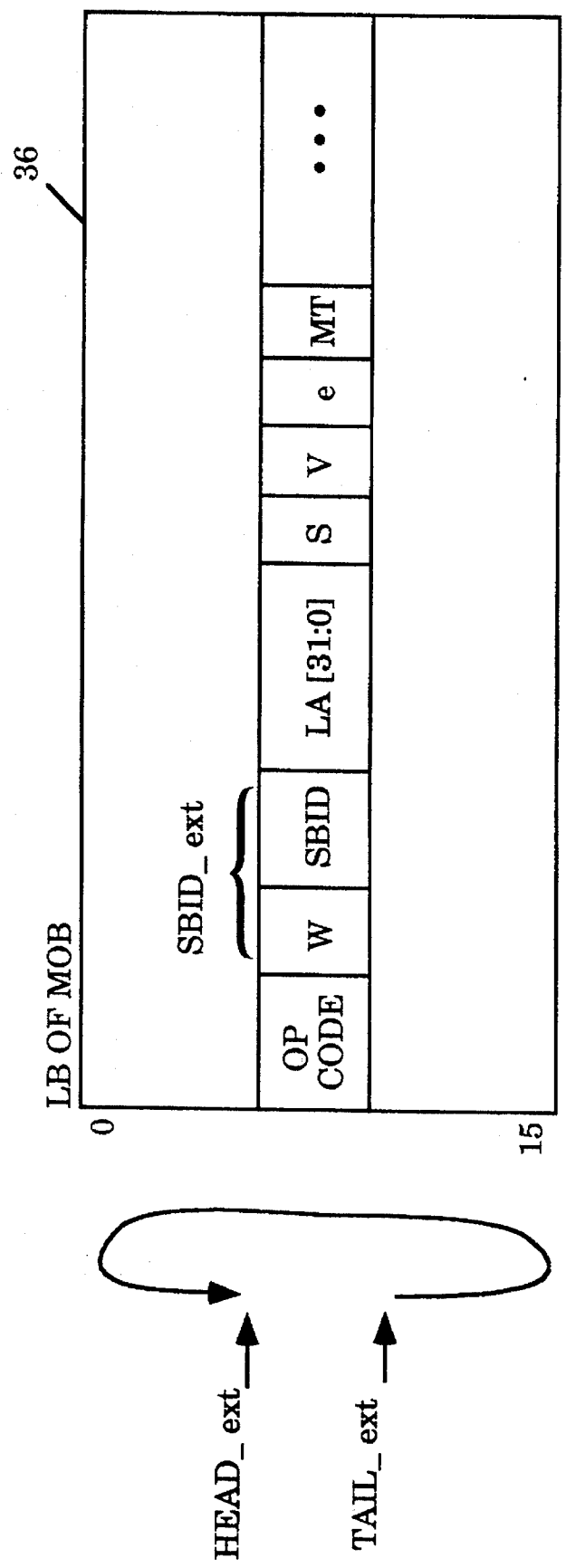
FIG. 4 illustrates the load buffer (LB) of the MOB of FIG. 2.

Referring now to FIG. 4, a block diagram illustrating the load buffer of the MOB 25 is shown. The LB 36 of the MOB 25 contains a number of buffer slots, 16 buffer slots for the illustrated embodiment. Each buffer slot is identified by a load buffer identifier (LBID). The buffer slots are allocated in order from top to bottom and then wraps around in a circular manner after reaching the bottom buffer slot. A wraparound bit is set/reset each time the allocation wraps around. A head pointer (LB head_ext) comprising a LBID and a wraparound bit value, and a tail pointer (LB tail_ext) comprising also a LBID and a wraparound bit value, are used to track the youngest and the oldest entries in these buffers. The head pointer is updated whenever a buffer slot is allocated for a load operation. Similarly, the tail pointer is updated whenever an allocated buffer slot is deallocated.

Each load operation is allocated a buffer slot of the LB 36 of the MOB 25, and identified by the LBID of the allocated buffer slot. A buffered load operation, including its opcode, wrap bit (w), store buffer identifier (SBID), linear address (LA[31:0]), and memory type (MT), is stored in its allocated buffer slot of the LB 36. Additionally, the buffered load operation also includes a number of control bits, including a split bit (s), a valid bit (v), and an execution state (e) bit. The w-bit and the SBID indicate the wrap around state and the youngest buffered STA of the SAB 32 at the time the buffer slot of the LB 36 is assigned. The SBID combined with the w bit is also referred as the extended SBID (SBID_ext). The SBID_ext is used to identify which buffered STAs are older than the load operation. Alternatively, it will be appreciated the relative age of the load and buffered STA operations may be determined in a variety of other manners including but not limited to time stamping the various load and STA operations. Similar to a buffered store operation, the size of a load operation is inferred from the opcode. The MT identifies the memory type of the source memory locations. The s-bit indicates whether the buffered load operation references memory locations that span two 64-bit data blocks (see ref. 90a–90b of FIG. 11). The v-bit indicates whether the particular LB entry is valid. The e-bit indicates whether the particular load operation has been promoted to at least a speculatively executed state. Lastly, The load operations are promoted to processor or retirement ready states in due course, after the return of the data being loaded. The retirement ready load operations are then retired in order, and purged from the LB 36.

Figure 5:
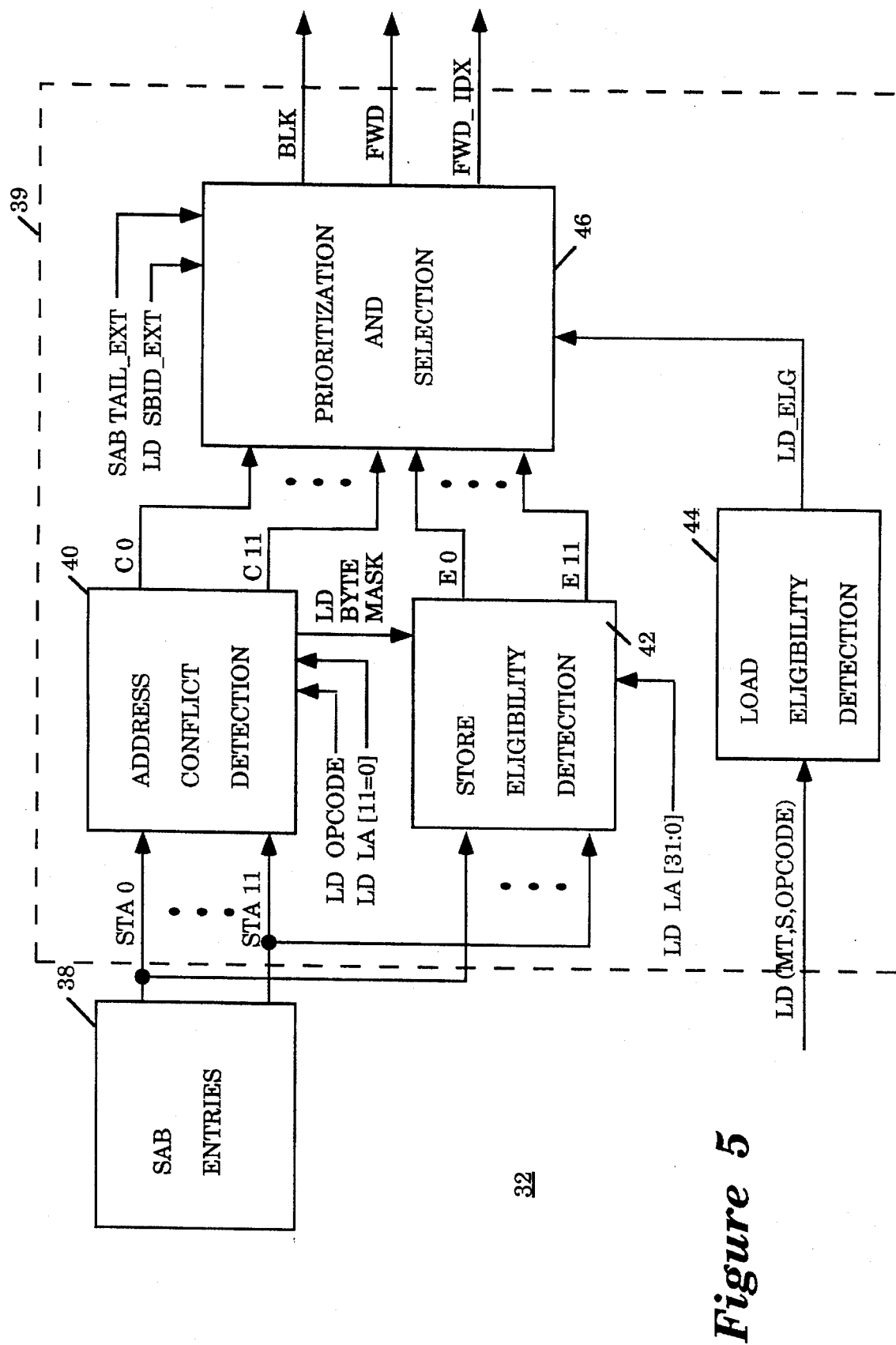
FIG. 5 illustrates the relevant portions of the SAB of FIG. 3 in further detail.

Referring now to FIG. 5, a block diagram illustrating the relevant portions of one embodiment of the SAB 32 in further detail is shown. As illustrated, in addition to the buffer slots 38, the SAB 32 further comprises store forwarding circuitry 39 that conditionally forwards store data for a load operation from a variable subset of the buffered store operations that is functionally dependent on the time the load operation is issued, taking into account the execution states of these buffered store operations. The load operation may be issued speculatively, and/or executed out-of-order. The execution states of the buffered store operations may be speculatively executed or committed.

In the embodiment illustrated, the store forwarding circuitry 39 comprises address conflict detection circuitry 40, store eligibility detection circuitry 42, load eligibility detection circuitry 44, and prioritization and selection circuitry 46. The address conflict detection circuitry 40 identifies all address conflicts between the load and buffered store operations, using the untranslated portions of the virtual addresses. The store eligibility detection circuitry 42 determines whether the store data of the buffered store operations are eligible to be forwarded, taking into account their execution states. Additionally, the store eligibility detection circuitry 42 takes into account a number of application dependent factors, such as address alignment, access length alignment, store data split, and store type. The load eligibility detection circuitry 44 determines whether the load operation is eligible to be forwarded store data, taking into account a number of application dependent factors, such as memory type, load data split, and load type. The prioritization and selection circuitry 46 prioritizes and blocks the load operation, based on the conflict detection results. Additionally, the prioritization and selection circuitry 46 selects and forwards one of the store data within the variable subset if any for the blocked load operation, based on the prioritization results, the store, and the load eligibility detection results.

The address conflict detection circuitry 40 receives the STA operations, a load operation's LA[11:0], and the load operation's opcode as inputs. In response, the address conflict detection circuitry 40 generates a number of conflict signals c0–c11 as outputs for the prioritization and selection circuitry 46. Additionally, in one embodiment, the address conflict detection circuitry 40 also generates a load byte mask for the load operation. The store eligibility detection circuitry 42 receives the STA operations, a load operation's LA[31:0], and the load operation's byte mask as inputs. In response, the store eligibility detection circuitry 42 generates a number of eligibility signals e0–e11 as outputs for the prioritization and selection circuitry 46. The load eligibility detection circuitry 44 receives a load operation's opcode, MT, and s-bit as inputs. In response, the load eligibility detection circuitry 44 generates a load eligibility signal LD_ELG as outputs for the prioritization and selection circuitry 46. The prioritization and selection circuitry 44 receives c0–c11, e0–e11, LD_ELG, a load operation's SBID_ext, and the SAB's Tail_ext as inputs. In response, the prioritization and selection circuitry 46 generates a block signal (BLK) denoting the load operation is to be blocked if at least one address conflict is detected within the subset of buffered store operations. Additionally, the prioritization and selection circuitry 46 generates a store forward signal (FWD) and a store forward index (FWD_IDX) identifying the store data if any within the subset to be forwarded as outputs. The BLK signal is provided to the LB 36, causing the load operation to be blocked. The FWD signal is provided to the LB 36 and the FWD_IDX is provided to the SDB 30, causing the store data of the indexed STD entry in the SDB 30 to be forwarded to the blocked load operation.

While the present invention is being described with store forwarding circuitry 39 disposed inside the SAB 32, based on the descriptions to follow, it will be appreciated that the present invention may be practiced with the store forwarding circuitry 39 disposed inside or outside the SAB 32. Additionally, while the present invention is being described with an embodiment of the store forwarding circuitry 39 that performs the load and store eligibility detections separately and before the prioritization and selection are made, it will be appreciated that alternatively the store forwarding circuitry 39 may perform the load and store eligibility detection together and/or after the prioritization and selection. Performing the eligibility detection after prioritization and selection will require less hardware, however based on the descriptions to follow, it will be appreciated that the approach is slower. Nevertheless, it may be the "preferred" approach, if the decrease in performance is acceptable, and savings in die space is more important. Furthermore, while the present invention is being described with the store eligibility detection circuitry 42 receiving the load byte mask from the address conflict detection circuitry 40, based on the descriptions to follow, it will be appreciated that the present invention may be practiced with the address conflict detection circuitry 40 receiving the load byte mask from the store eligibility detection circuitry 42. Alternatively, each of the circuitry 40 and 42 may also individually compute the load byte mask or receive the load byte mask from an external source.

Figure 6:
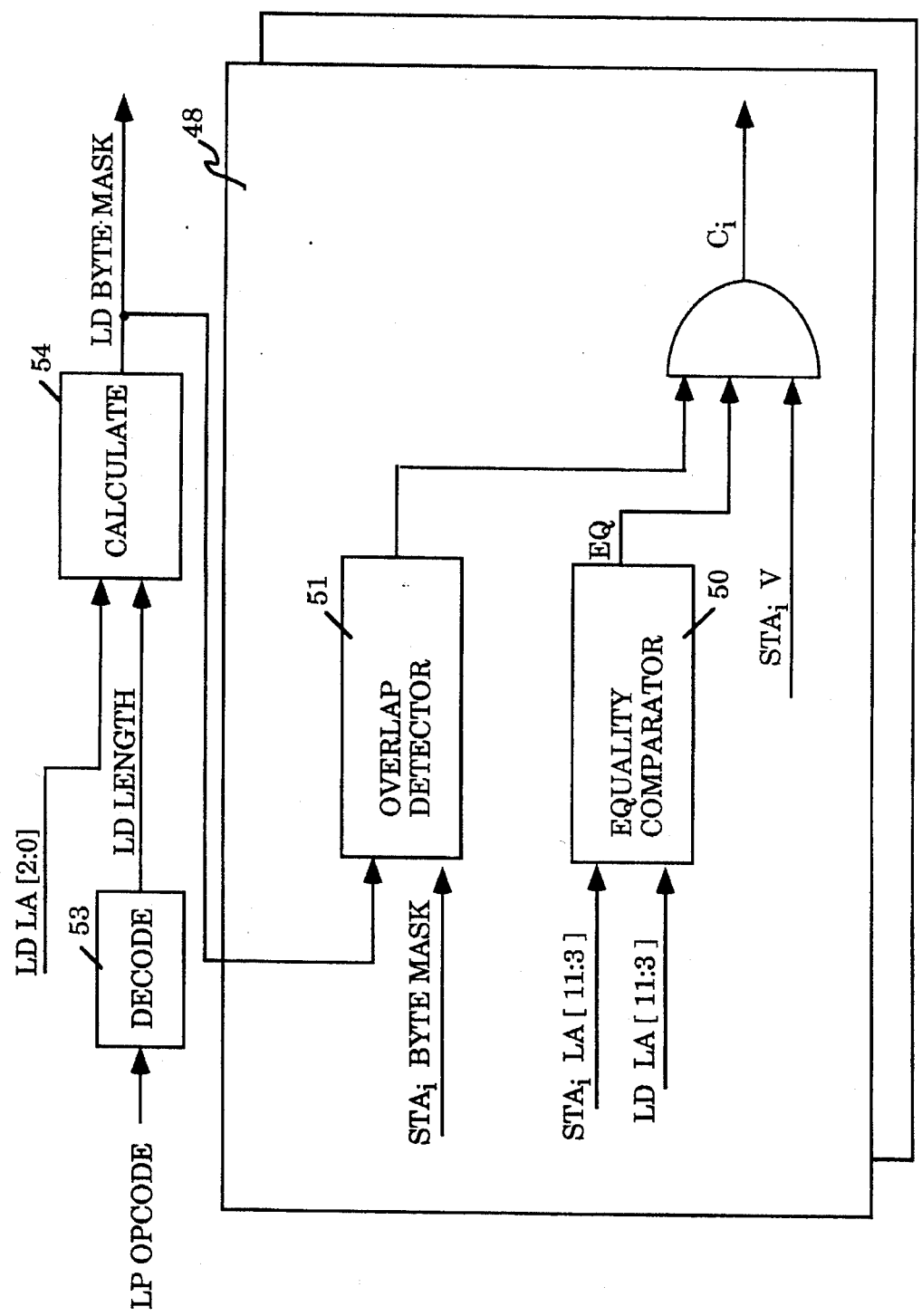
FIG. 6 illustrates the relevant portions of one embodiment of the conflict detection circuitry of FIG. 5 in further detail.

Referring now to FIG. 6, a block diagram illustrating the relevant portions of one embodiment of the address conflict detection circuitry 40 is shown. As described earlier, the address conflict detection circuitry 40 identifies all address conflicts between the load and the buffered store operations. In this embodiment, the address conflict detection circuitry 40 comprises a decoder 53, a calculate circuit 54, and a number of identical address evaluation circuits 48, one per SAB buffer slot. The decoder 53 and the calculate circuit 54 are used to calculate a load byte mask for a load operation. Each address evaluation circuit 48 is used to evaluate the LA of the load operation against the LA of a buffered STA operation for address conflict detection. In one embodiment, the address evaluation circuit 48 is also used to evaluate whether the byte masks of the store operation and the load operation overlap.

The decoder 53 receives the load operation's opcode as input. In response, the decoder 53 outputs the load operation's access length for the calculate circuit 54. The calculate circuit 54 receives the load operation's access length and it's LA[2:0] as inputs. In response, the calculate circuit 54 outputs a load byte mask for the load operation.

Each address conflict detection circuit 48 comprises an equality comparator 50, an overlap detector 51, and an AND gate 52. The equality comparator 50 compares the untranslated portion of the linear address of the load operation with the corresponding portion of the linear address of a buffered STA operation. The overlap detector 51 compares the load byte mask of the load operation with the store byte mask of a buffered STA operation. The AND gate 52 validates the output of the comparisons in accordance to whether the buffered STA operation is valid or not. The equality comparator 50 receives the LA[11:3] of a buffered STA operation and the LA[11:3] of the load operation as inputs. In response, the equality comparator 50 outputs a match signal having a value of logic one if the two partial linear addresses match each other. The overlap detector 51 receives store byte mask of a buffered STA operation and the load byte mask of the load operation as inputs. In response, the overlap detector 51 outputs an overlap signal having a value of logic one if the two byte masks overlap each other. The AND gate 52 receives the match signal, the overlap signal, and the v-bit of the same buffered STA operation as inputs. In response, the AND gate 52 generates the logical AND of these signals as the $c_i$ signal.

Figure 7:
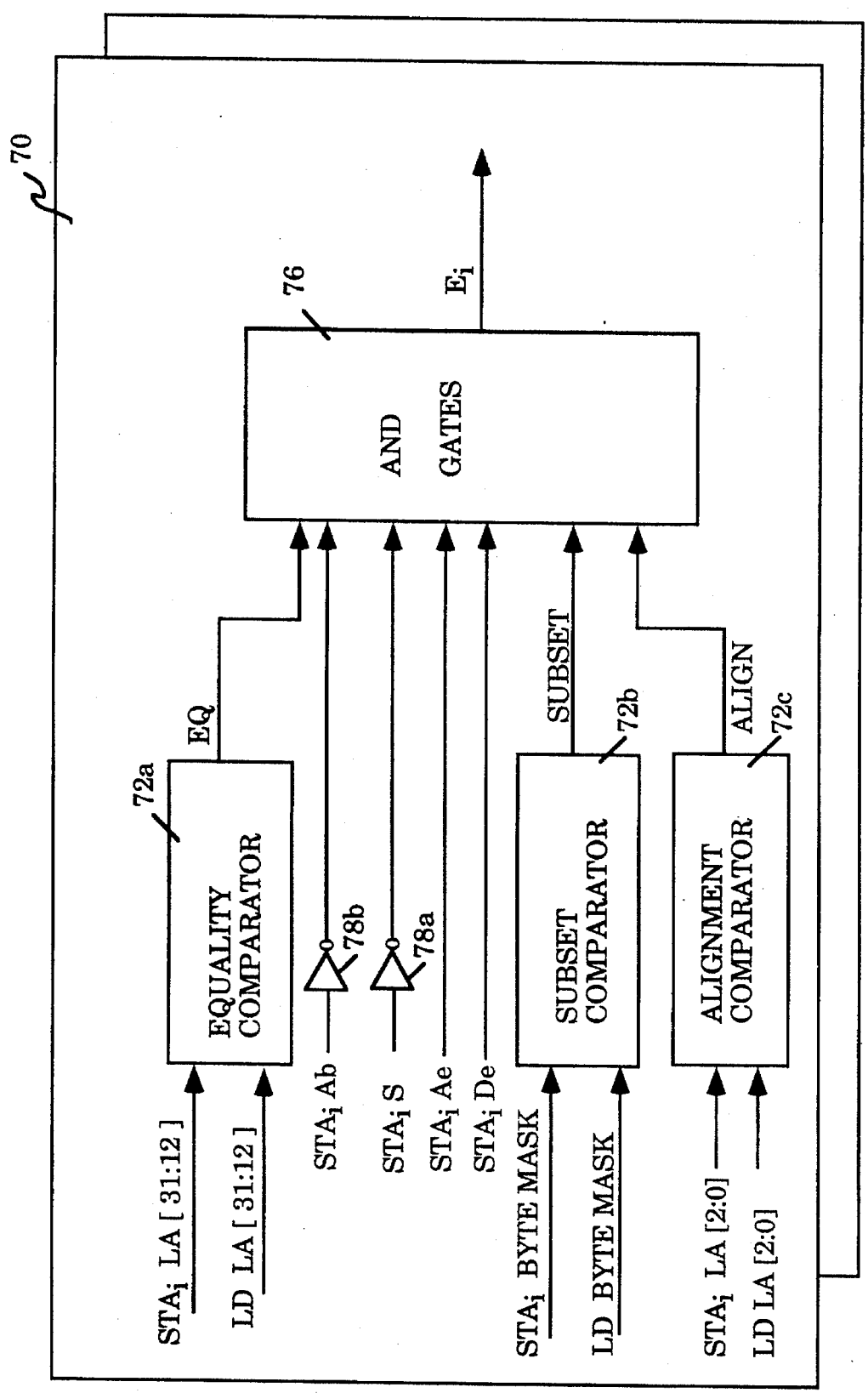
FIG. 7 illustrates the relevant portions of one embodiment of the store eligibility detection circuitry of FIG. 5 in further detail.

Referring now to FIG. 7, a block diagram illustrating the relevant portions of one embodiment of the store eligibility detection circuitry 42 is shown. As described earlier, the store eligibility detection circuitry 42 determines whether the store data of the buffered store operations are eligible to be forwarded, taking into account their execution states, and a number of application dependent factors. In this embodiment, the store eligibility detection circuitry 42 comprises a number of identical store eligibility evaluation circuit 70, one for each buffered STA operation. Each store eligibility evaluation circuit 70 comprises a number of comparators 72a–72c, a number of inverters 78a–78b, and a number of AND gates 76. The comparators 72a–72c determine whether a load operation and a buffered STA operation are address aligned and whether the access length of the load operation is a subset of the access length of the store operation. The inverters 78a–78b ensure that the buffered STA operation does not reference memory locations spanning two 64-bit data blocks and the buffered STA operation is not an all blocking STA operation. The AND gates 76 ensures all these conditions as well as the execution state conditions are met.

The equality comparator 72a receives the load operation's LA[31:12] and a buffered STA operation's LA[31:12] as inputs. In response, the equality comparator 72a outputs a match signal with a value set to logic one if the two partial LAs are equal. The subset comparator 72b receives the load operation's byte mask and the same buffered STA operation's byte mask as inputs. In response, the second comparator 72b outputs a subset signal with a value set to logic one if the size of the load operation is equal to or smaller than the size of the buffered STA operation. The alignment comparator 72c receives the load operation's LA[2:0] and the same buffered STA operation's LA[2:0] as inputs. In response, the alignment comparator 72c outputs an align signal with a value set to logic one if the load operation is aligned with the buffered store operation.

The inverters 78a and 78b invert the a-bit and the s-bit of the same buffered STA operation respectively. The AND gates 76 receive the match signal, the subset signal, the align signal, the inverted Ab-bit, the inverted s-bit, the Ae-bit, and the De-bit as inputs. In response, the AND gates 76 output the logical AND of all these inputs as the eligibility signal $E_i$. In other words, the $E_i$ signal is output with its value set to one if all the condition signals are set.

While the eligibility evaluation circuit 70 has been described with address alignment, access length, all blocking, data split, and execution state conditions, it will be appreciated that the present invention may be practiced with eligibility established using less or more conditions, provided appropriate compensating circuits are provided. For example, if appropriate data shifting circuit are provided to compensate for potential address misalignments, the address alignment requirement may be relaxed.

Figure 8:
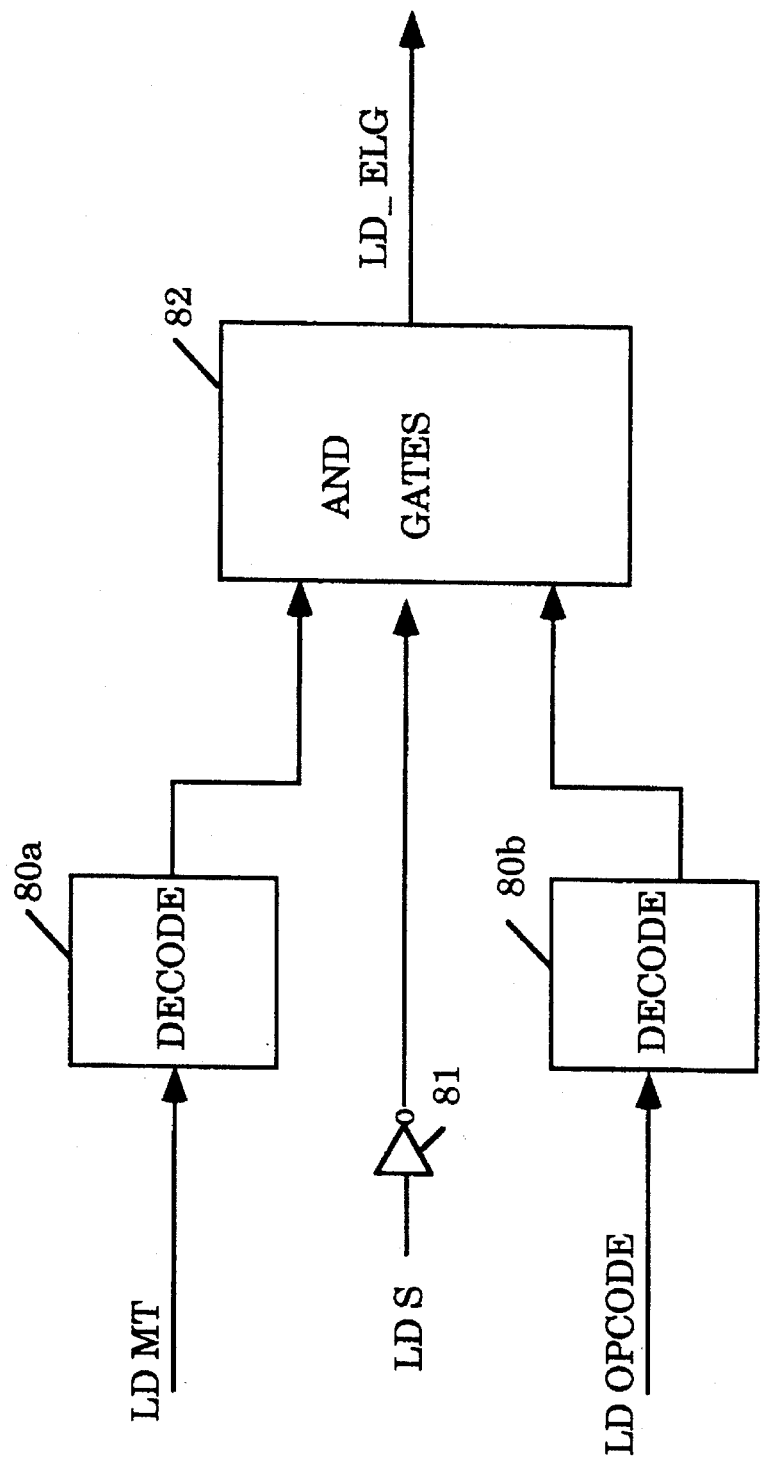
FIG. 8 illustrates the relevant portions of one embodiment of the load eligibility detection circuitry of FIG. 5 in further detail.

Referring now to FIG. 8, a block diagram illustrating the relevant portions of one embodiment of the load eligibility detection circuitry 42 is shown. As described earlier, the load eligibility detection circuitry 44 determines whether a load operation is eligible to be forwarded store data, taking into account a number of application dependent factors. In this embodiment, the load eligibility detection circuitry 42 comprises two decoders 80a–80b, an inverter 81 and a number of AND gates 82. The two decoders 80a–80b determine whether the load operation's MT and opcode are eligible MT and opcode respectively. The inverter 81 ensure that the load operation does not reference memory locations spanning two 64-bit data blocks. The AND gates 82 ensure these and the data split conditions are met.

The first decoder 80a receives the load operation's MT, and in response, outputs an eligible load memory type signal E_MT with a value set to logic one if the load operation's MT is an eligible MT. The second decoder 80b receives the load operation's opcode, and in response, outputs an eligible load opcode signal E_opcode with a value set to logic one if the load operation's opcode is an eligible opcode. The inverter 81 inverts the s-bit of the same buffered STA operation. The AND gates 82 receive the E_MT, the E_opcode, and the inverted s-bit as inputs. In response, the AND gates 82 output the logical AND of all these inputs as the load eligibility signal LD_ELG. In other words, the LD_ELG signal is output with its value set to one if all the condition signals are set.

Figure 9:
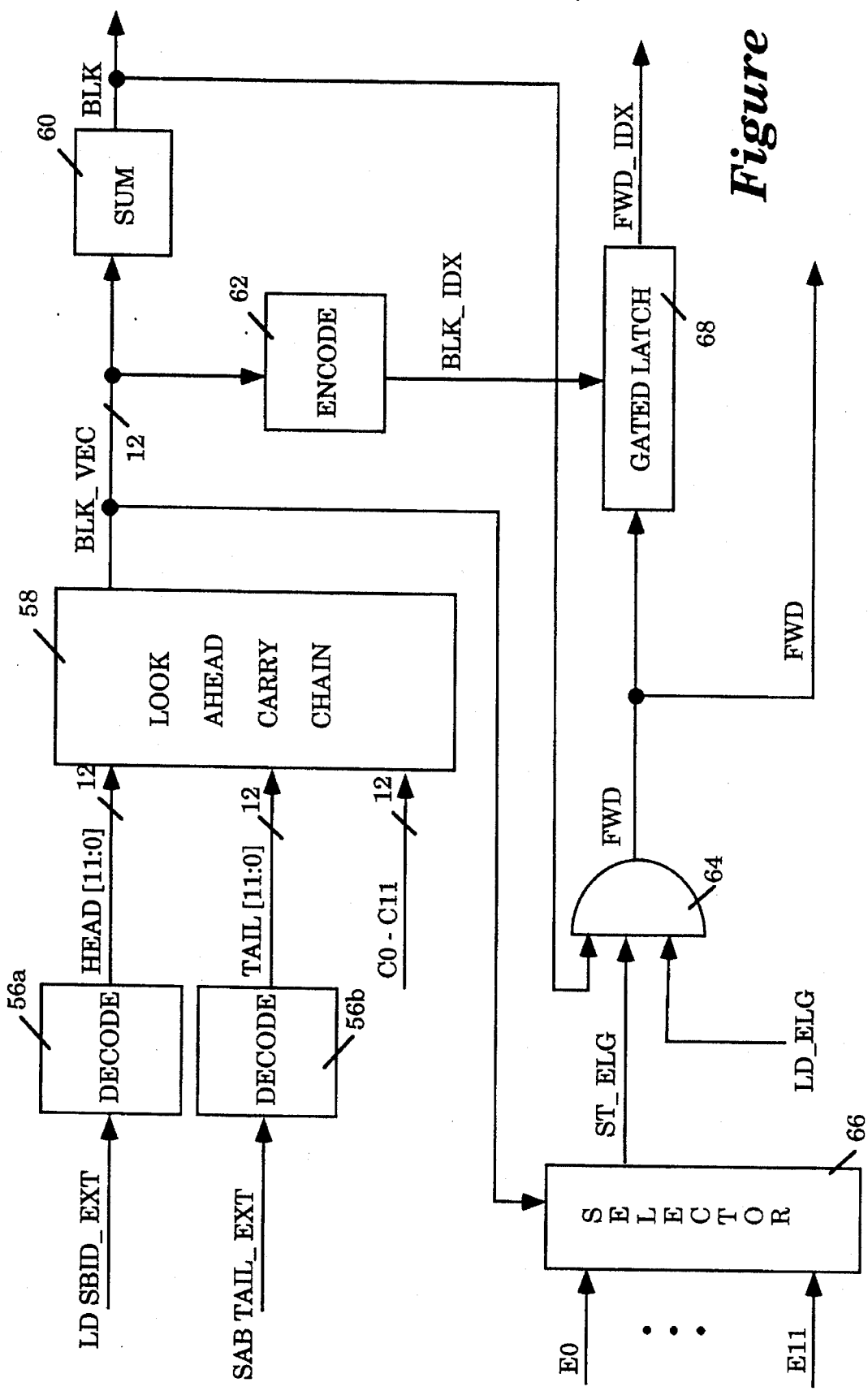
FIG. 9 illustrates the relevant portions of one embodiment of the prioritization and selection circuitry of FIG. 5 in further detail.
Figure 10:
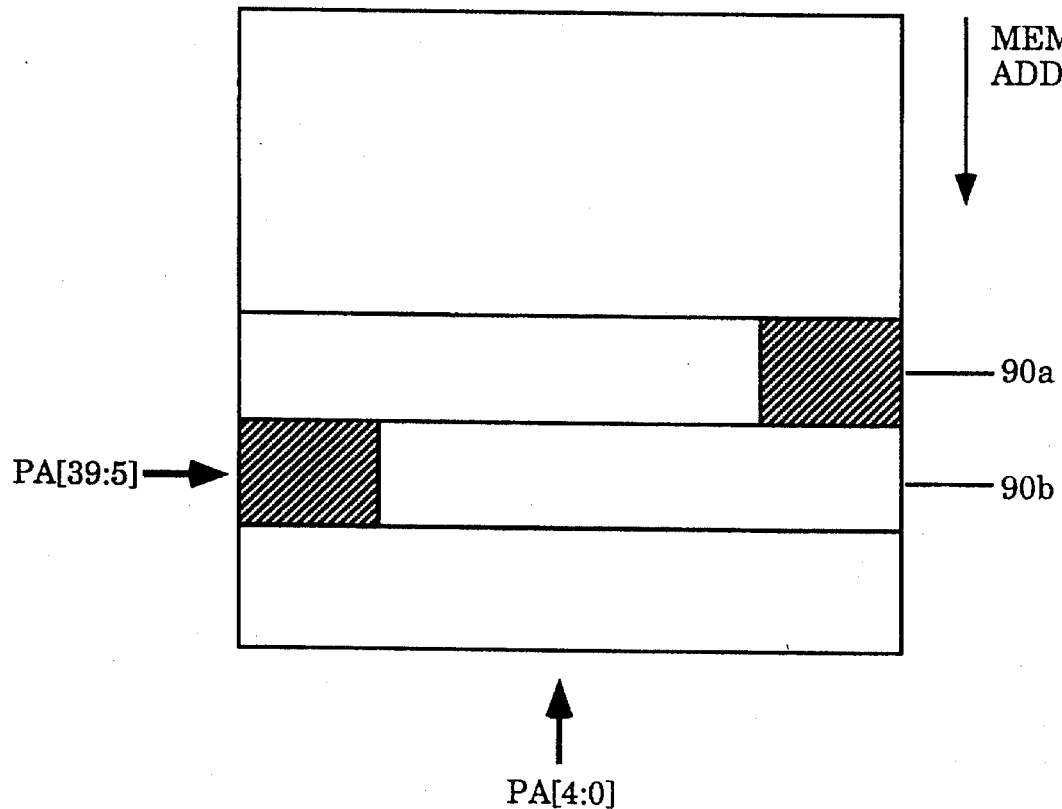
FIG. 10 illustrates an exemplary data split of a memory store or load operation.

Referring now to FIG. 9, a block diagram illustrating the relevant portions of one embodiment of the prioritization and selection circuitry 46 is shown. As described earlier, the prioritization and selection circuitry 46 prioritizes and conditionally blocks a load operation, based on the conflict detection results, as well as selects and forwards one of the store data within the variable subset if any, based on the prioritization results, the store, and the load eligibility detection results. In this embodiment, the prioritization and selection circuit 46 comprises a number of decoders 56a–56b, a lookahead carry chain 58, a sumer 60, an encoder 62, a selector 66, an AND gate 64, and a gated latch 68. The decoders 56a–56b determine the head and tail of the variable subset of buffered store operations that are older than the load operation. The lookahead carry chain 58 prioritizes the address conflicts within the variable subset of buffered store operations. The sumer 60 generates a block signal BLK indicating that at least one address conflict within the variable subset of buffered store operations is detected. The encoder 62 generates an identifier BLK_IDX identifying the youngest of the address conflicts within the variable subset of buffered store operations. The selector 66 selects and outputs a store eligibility signal ST_ELG if the youngest address conflicting buffered store operation is an eligible store operation. The AND gate 64 ensure the store and load eligibility conditions are met, and generates a store forward signal FWD indicating the appropriate store data will be forwarded. Lastly, the gated latch 68 generates an identifier identifying the SDB entry where the store data is to be retrieved and forwarded.

The first decoder 56a receives the load operation's SBID_ext as input, and in response, outputs a 12-bit head vector HEAD[11:0]. The 12-bits correspond to the 12 buffer slots. The bit corresponding to the buffer slot where the youngest STA operation that is older than the load operation is set to a value of logic one, and all others bits are set to zero. The second decoder 56b receives the load operation's SAB TAIL_ext as input, and in response, outputs a 12-bit tail vector TAIL[11:0]. Similarly, the 12-bits correspond to the 12 buffer slots. The bit corresponding to the buffer slot where the oldest STA operation that is older than the load operation is set to a value of logic one, and all others bits are set to zero.

The lookahead carry chain 58 receives the address conflict signals c0–c11, the HEAD and the TAIL vectors as inputs. In response, the lookahead carry chain 58 generates a 12-bit block vector BLK_VEC. The 12-bits correspond to the 12 conflict signals. The bit corresponding to the youngest of the subset of buffered STA operations as denoted by the HEAD and TAIL vectors is set if its corresponding conflict signal is set. All other bits are output unset.

The sumer 60 receives the BLK_VEC as input, and in response generates a 1-bit block signal BLK. BLK is set if one of 12 bits of BLK_VEC is set. BLK when set denotes at least one address conflict is detected within the subset of buffered STA operations that are older than the load operation. In addition to being used to generate FWD signal and FWD_IDX, which will be described in more detail below, the BLK signal is also provided to the LB 36. The encoder 62 receives the BLK_EC as input, and in response, outputs an index BLK_IDX identifying the youngest address conflicting STA operation within the subset of buffered STA operations.

The selection circuit 66 receives the $E_i$ signals and the BLK_VEC as inputs. In response, the $E_i$ signal indexed by the BLK_VEC is output as the store eligible signal ST_ELG. The ST_ELG signal when set denotes that the store data of the youngest address conflicting STA operation within the subset of buffered store operations is eligible to be forwarded.

The AND gate 64 receives the ST_ELG and the LD_ELG signals as inputs, and in response, outputs the logical AND of these signals as the store forward FWD signal. The FWD signal when set denotes that the eligible store data of the youngest address conflicting STA operation with the subset of buffered store operations is to be forwarded. As described earlier, the FWD signal is provided to the LB 36. In an embodiment, where it is possible for the selection circuit 66 to output ST_ELG set even if the bits of BLK_VEC are zeroes, the AND gate 64 further receives the BLK signal as input.

The gated latch 68 receives FWD and BLK_IDX as inputs, and in response, conditionally outputs the BLK_IDX as the FWD_IDX if the FWD signal is set to logic one. As described earlier, FWD_IDX is provided to the SDB 30, causing the store data of the indexed STD entry in the SDB 30 to be forwarded to the load operation.

While the present invention has been described in terms of the illustrated embodiments, those skilled in the art will recognize that the invention is not limited to the embodiments described. The method and apparatus of the present invention can be practiced with modification and alteration within the spirit and scope of the appended claims. The description is thus to be regarded as illustrative instead of limiting on the present invention.

What is claimed is:

1. In an out-of-order execution computer system comprising a store buffer for buffering a plurality of memory store operations issued over a period of time during operation, wherein each memory store operation includes a store opcode, a store address, store control information including information on execution state, and store data, an apparatus for conditionally outputting selected ones of said buffered store data in response to a memory load operation issued in a particular instant in time, said memory load operation having a load opcode, a load address and load control information, said apparatus comprising:

a) selection circuitry coupled to said store buffer for generating a first and a second control signal for said store buffer based on a first plurality of received store eligibility signals and a received third control signal, said first control signal signaling said store buffer to output buffered store data of one of its buffered memory store operations in response to said memory load operation, whereas said second control signal identifying for said store buffer the buffered memory store operation whose store data are to be output, and said received store eligibility signals correspondingly denoting for said selection circuitry whether said buffered memory store operations are eligible to have their store data output by said store buffer in response to said memory load operation, whereas said received third control signal denoting for said selection circuitry the youngest buffered memory store operation that is older than said memory load operation, and having addressing conflict with said memory load operation;

(b) eligibility detection circuitry coupled to said store buffer and said selection circuitry for receiving execution state signals denoting executing states of said buffered memory store operations from said store buffer, and generating said store eligibility signals for said selection circuitry based on said received execution state signals.

2. The apparatus as set forth in claim 1, wherein said apparatus further comprises:

c) prioritization circuitry coupled to said selection circuitry for generating said third control signal for said selection circuitry based on a plurality of received address conflict signals, said received address conflict signals correspondingly denoting for said prioritization circuitry address conflicts between said buffered memory store operations and said memory load operation, and said generation of said third control signal includes prioritization of said address conflict signals by order of precedence of the corresponding buffered memory store operations by said prioritization circuitry;

d) address conflict detection circuitry coupled to said prioritization circuitry and said store buffer for generating said address conflict signals for said prioritization circuitry based on a received first portion of said load address, and received corresponding portions of said store addresses of said buffered memory store operations from said store buffer, said address conflict detection circuitry receiving said first portion of said load address as a result of said issuance of memory load operation.

3. The apparatus as set forth in claim 2, wherein said address conflict detection circuitry comprises (d.1) a plurality of address evaluation circuits, one for each buffer slot of said store buffer, coupled to said store buffer and said prioritization circuitry for generating said address conflict signals for said prioritization circuitry, based on a first not-subject-to-translation portion of said lead address, which is a virtual address, and corresponding not-subject-to-translation portions of said store addresses of said buffered memory store operations, which are also virtual addresses, said address conflict detection circuitry receiving said first not-subject-to-translation portion of said load address as a result of said issuance of said memory load operation, and said address conflict detection circuitry receiving said corresponding no-subject-to-translation portions of said store addresses from said store buffer.

4. The apparatus as set forth in claim 3, wherein said address evaluation circuits further base said address conflict signals generation on whether there are byte mask overlaps between said memory load operation and said buffered memory store operations, said address evaluation circuits determining whether there are byte mask overlaps by comparing a load byte mask, with received store byte masks of said buffered memory store operations from said store buffer;

said buffered store control information of each of said buffered memory store operations further includes a store byte mask of the buffered memory store operation;

said address conflict detection circuitry further comprises (d.2) byte mask calculation circuitry coupled to said address evaluation circuits for calculating said load byte mask of said memory load operation for said address evaluation circuits based on said load opcode and a second not-subject-to-translation portion of said load address, said byte mask calculation circuitry receiving said load opcode and said second not-subject-to-translation portion of said load address as a result of said issuance of said memory load operation.

5. The apparatus as set forth in claim 2, wherein, said computer system identifies said store buffers by unique store buffer identifiers (SBIDs), allocates said store buffers to said memory store operations in a circular manner, and manages said circular allocation using two of said SBIDs and a wrap bit (w), said computer system setting/resetting said w-bit each time said circular allocation wraps around;

said computer system records the SBID and w-bit values at the time said memory load operation is issued for said memory load operation;

said prioritization circuitry prioritizes said address conflict signals using said recorded SBID and w-bit values of said memory load operation.

6. The apparatus as set forth in claim 5, wherein said address conflict signal prioritization includes identification of the buffered memory store operations that are older than said memory load operation;

said prioritization circuitry identifies said buffered memory store operations that are older than said memory load operation based on said recorded SBID and w-bit values, and another set of SBID and w-bit values identifying a current tail buffer slot of said store buffer.

7. The apparatus as set forth in claim 1, wherein said selection circuitry further bases said first and second control signals generation on a received load eligibility signal denoting whether said memory load operation is eligible to have said store buffer outputs store data of one of its buffered memory store operations in response to said memory load operation;

said eligibility detection circuitry comprising:

(b.1) store eligibility detection circuitry coupled to said store buffer and said selection circuitry for receiving execution state signals denoting execution states of said buffered memory store operations from said store buffer, and generating said store eligibility signals for said selection circuitry based on said received execution state signals; and (b.2) load eligibility detection circuitry coupled to said store buffer and said selection circuitry for generating said load eligibility signal for said selection circuitry based on said load opcode and said load control information, said load eligibility detection circuitry receiving with said load opcode and said load control information as a result of said issuance of said memory load operation.

8. The apparatus as set forth in claim 7, wherein said load eligibility detection circuitry further bases said load eligibility signal generation on a received load data boundary alignment signal denoting whether data to be loaded for said memory load operation is data boundary aligned or not, said load eligibility detection circuitry receiving said load data boundary alignment signal as a result of said issuance of said memory load operation, and said load control information further including said information on data boundary alignment for said memory load operation.

9. The apparatus as set forth in claim 7, wherein said load eligibility detection circuitry further bases said load eligibility signal generation on source location memory type of said memory load operation, said load eligibility detection circuitry decoding a received load memory type signal to determine the source location memory type of said memory load operation, said load eligibility detection circuitry receiving said load memory type signal as a result of said issuance of said memory load operation, and said load control information including information on memory type of said memory load operation.

10. The apparatus as set forth in claim 7, wherein said load eligibility detection circuitry further bases said load eligibility signal generation on load type of said memory load operation, said load eligibility detection circuitry decoding said load opcode to determine the load type of said memory load operation, said load eligibility detection circuitry receiving said load opcode as a result of said issuance of said memory load operation.

11. The apparatus as set forth in claim 1, wherein said eligibility detection circuitry considers a buffered memory store operation in a speculatively executed state as well as a buffered memory store operation in a committed state as eligible buffered memory store operations.

12. The apparatus as set forth in claim 1, wherein,
said eligibility detection circuitry further bases said store eligibility signals generation on whether there are address conflicts between a subject-to-translation portion of said load address, which is a virtual address, and corresponding subject-to-translation portions of said store addresses of said buffered memory store operations, which are also virtual addresses, said eligibility circuitry comparing said subject-to-translation portion of said load address with said corresponding subject-to-translation portions of said store addresses of said buffered memory store operations, said eligibility circuitry receiving said subject-to-translation portions of said store addresses from said store buffer, and said subject-to-translation portion of said load address as a result of said issuance of said memory load operation.

13. The apparatus as set forth in claim 1, wherein said eligibility detection circuitry further bases said store eligibility signals generation on whether said store data of said buffered memory store operations are data boundary aligned, said eligibility circuitry receiving store data boundary alignment signals corresponding to said buffered memory store operations from said store buffer; and
said buffered store control information of each of said buffered memory store operations further includes information on store data boundary alignment of the buffered memory store operation.

14. The apparatus as set forth in claim 1, wherein said eligibility detection circuitry further bases said store eligibility signals generation on relative length of data to be loaded for said memory load operation and said store data of said buffered memory store operations, said eligibility circuitry comparing a received load byte mask, with received store byte masks of said buffered memory store operations from said store buffer;
said eligibility detection circuitry receiving said load byte mask as a result of said issuance of said memory load operation, and said buffered store control information of each of said buffered memory store operations further includes a store byte mask for the buffered memory store operation.

15. The apparatus as set forth in claim 1, wherein said eligibility detection circuitry further bases said store eligibility signals generation on relative alignment between data to be loaded for said memory load operation and said store data of said buffered memory store operations said eligibility circuitry comparing a received not-subject-to-translation portion of said load address, with received corresponding not-subject-to translation portions of said store addresses of said buffered memory store operations from said store buffer, said eligibility circuitry receiving said not-subject-to-translation portion of said load address as a result of said issuance of said memory load operation.

16. The apparatus as set forth in claim 1, wherein said eligibility detection circuitry further bases said store eligibility signals generation on whether said buffered memory store operations are unconditional blocking memory store operations said eligibility circuitry receiving unconditional blocking signals so denoting from said store buffer;
said buffered store control information of each of said buffered memory store operation further includes information on whether the buffered memory store operation is an unconditional blocking memory store operation.

17. In an out-of-order execution computer system comprising a store buffer for buffering a plurality of memory store operations issued over a period of time during operation, wherein each buffered memory store operation includes a store opcode, a store address, store control information including information on execution state, and store data, a method for signaling a store buffer to output buffered store data of one of said buffered memory store operations in response to a memory load operation issued in a particular instant in time, said memory load operation includes a load opcode, a load address and load control information, said method comprising the steps of:

a) generating a plurality of store eligibility signals denoting eligibility of said buffered memory store operations for having the buffered memory store operations' buffered store data output in response to said memory load operation, based on a plurality of execution state signals received from said store buffer denoting execution states of said buffered memory store operations; and b) generating a first and a second control signal for said store buffer based on said plurality of store eligibility signals and a received third control signal said first control signal signaling said store buffer to output store data of one of its buffered memory store operation in response to said memory load operation, said second control signal identifying for said store buffer the buffered memory store operation whose store data are to be output, and said third control information denoting the youngest buffered memory store operation that is older than said memory load operation and having address conflict with said memory load operation.

18. The method as set forth in claim 17, wherein, said step (a) further comprises generating a plurality of address conflict signals denoting address conflicts between said memory load operation and said buffered memory store operations, based on a received first portion of said load address, and received corresponding portions of said store addresses from said store buffer, and prioritizing said address conflict signals by order of precedence of their corresponding buffered memory store operations, said first portion of said load address being received as a result of said issuance of said memory load operation.

19. The method as set forth in claim 18, wherein said address conflict signals generation comprises evaluating a received first not-subject-to translation portion of said load address, which is a virtual address, against received corresponding not-subject-to-translation portions of said store addresses which are also virtual addresses, for address conflicts, said first not-subject-to translation portion of said load address being received as a result of said issuance of said memory load operation, and said corresponding not-subject-to-translation of said store addresses being received from said store buffer.

20. The method as set forth in claim 19, wherein said address conflict signals generation is further based on whether there are byte mask overlaps between said memory load operation and said buffered memory store operations:
said address conflicts signals generation further comprises calculating a load byte mask of said memory load operation based on said load opcode and a second not-subject-to-translation portion of said load address, and evaluating said calculated load byte mask of said memory load operation against received store byte masks of said buffered memory store operations from said store buffer for byte mask overlaps, said second not-subject-to-translation portion of said load address being received as a result of said issuance of said memory load operation.

21. The method as set forth in claim 18, wherein, said computer system identifies said store buffers by unique store buffer identifiers (SBIDs), allocates said store buffers to said memory store operations in a circular manner, and manages said circular allocation using two of said SBIDs and a wrap bit (w), said computer system setting/resetting said w-bit each time said circular allocation wraps around;

said computer system records the SBID and w-bit values at the time said memory load operation is issued for said memory load operation;

said address conflict signals prioritization uses said recorded SBID and w-bit values to prioritize said address conflict signals.

22. The method as set forth in claim 21, wherein said address conflict signals prioritization includes determining buffered memory store operations that are older than said memory load operation;

said address conflict signals prioritization identifies said memory store operations that are older than said memory load operation based on said recorded SBID and w-bit values, and another set of SBID and w-bit values identifying a current tail buffer slot of said store buffer.

23. The method as set forth in claim 17, wherein said generation of said first and second control signals is further based on whether said memory load operation is eligible to have said store buffer outputs buffered store data in response to said memory load operation, said step further comprises the step of generating a load eligibility signal denoting eligibility of said memory load operation based on said load opcode and said load control information, said load opcode and said load control information being provided as a result of said issuance of said memory load operation.

24. The method as set forth in claim 23, wherein said load eligibility signal generation is further based on a received data boundary alignment signal, as a result of said issuance of said memory load operation, denoting whether data to be loaded for said memory load operation is data boundary aligned.

25. The method as set forth in claim 23, wherein said load eligibility signal generation is further based on source location memory type of said memory load operation;

said load eligibility signal generation further comprises decoding a memory type signal, received as a result of said issuance of said memory load operation, to determine said source location memory type of said memory load operation;

said load control information further includes information on memory type of said memory load operation.

26. The method as set forth in claim 17, wherein said step is performed with both a buffered memory store operation in a speculatively executed state as well as a buffered memory store operation in a committed state being considered as eligible buffered memory store operations.

27. The method as set forth in claim 17, wherein, said store eligibility signals generation are further based on whether received corresponding subject-to-translation portions of said store and load addresses, which are virtual addresses, of said buffered memory store operations and said memory load operation, are in conflict;

said store eligibility signals generation further include comparing said received corresponding subject-to-translation portions of said load and store addresses, said subject-to-translation portion of said load address being received as a result of said issuance of said memory load operation, and said subject-to-translation portions of said store addresses being received from said store buffer.

28. The method as set forth in claim 17, wherein said store eligibility signals generation are further based on a received boundary alignment signal from said store buffer denoting whether said buffered store data of said buffered memory store operations are data boundary aligned.

29. The method as set forth in claim 17, wherein said store eligibility signals generation are further based on relative length of data to be loaded for said memory load operation and said buffered store data of said buffered memory store operations;

said store eligibility signals generation further include comparing a received load byte mask of said memory load operation, with received store byte masks of said memory store operation from said store buffer, said load byte mask being received as a result of said issuance of said memory load operation, and said buffered store control information of each of said buffered memory store operations further including a store byte mask.

30. The method as set forth in claim 17, wherein said store eligibility signals generation are further based on relative alignment of data to be loaded for said memory load operation and said buffered store data of said buffered memory store operations;

said store eligibility signals generation further include comparing received corresponding not-subject-to-translation portions of said load and store addresses of said memory load operation and said memory store operations to determine said relative alignment, said not-subject-to-translation portion of said load address being received as a result of said issuance of said memory load operation, and said not-subject-to-translation portion of said store addresses being received from said store buffer.

31. The method as set forth in claim 17, wherein said store eligibility signals generation are further based on received blocking signals from said store buffer correspondingly denoting whether buffered memory store operations are unconditional blocking memory store operations.

32. The method as set forth in claim 17, wherein said load eligibility signal generation is further based on load type of said memory load operation;

said load eligibility signal generation further includes decoding said load opcode, received as a result of said issuance of said memory load operation, to determine said load type.

\* \* \* \* \*

UNITED STATES PATENT AND TRADEMARK OFFICE
CERTIFICATE OF CORRECTION

PATENT NO. : 5,606,670
DATED : February 25, 1997
INVENTOR(S) : Abramson et al.

It is certified that error appears in the above-identified patent and that said Letters Patent is hereby corrected as shown below:

In column 2 at line 67 delete "prioritization," and insert --prioritizes,--

In column 11 at line 52 delete "BLK_EC" and insert --BLK_VEC--

In column 13 at line 24 delete "lead" and insert --load--

Signed and Sealed this

Twenty-ninth Day of July, 1997

*Attest:*

BRUCE LEHMAN

*Attesting Officer*  *Commissioner of Patents and Trademarks*